A. WERTEPNY.
NON-SKID PROTECTOR FOR TIRES.
APPLICATION FILED MAY 18, 1914.

1,113,391.

Patented Oct. 13, 1914.

Witnesses
M. E. Lowry
F. R. Bryant

Inventor
A. Wertepny
A. M. Wilson
Attorney

UNITED STATES PATENT OFFICE.

ALEXANDER WERTEPNY, OF BELFIELD, NORTH DAKOTA.

NON-SKID PROTECTOR FOR TIRES.

1,113,391. Specification of Letters Patent. Patented Oct. 13, 1914.

Application filed May 18, 1914. Serial No. 839,302.

*To all whom it may concern:*

Be it known that I, ALEXANDER WERTEPNY, a subject of the Emperor of Austria-Hungary, residing at Belfield, in the county of Stark and State of North Dakota, have invented certain new and useful Improvements in Non-Skid Protectors for Tires, of which the following is a specification.

This invention relates to certain new and useful improvements in non-skid protector for tires.

The primary object of this invention is to provide an incasing tire protector provided with calked tread plates adapted to engage a wheel for removably securing the protector upon the tire thereof.

A further object is to provide a shoe protector with exterior tread plates connected together by chains and having hinged locking members provided with alinement positioning means and removably engaging the wheel.

A still further object is to provide a protecting shoe or casing for entirely covering an automobile tire and having outwardly-positioned tread plates suitably calked and connected together by chains and having hinged locking plates for engaging the wheel rim to secure the members upon the wheel.

With these general objects in view and others that will appear as the nature of the invention is better understood, the same consists in the novel construction and combination of parts hereinafter fully described, illustrated in the accompanying drawings, and pointed out in the appended claim.

Figure 1:
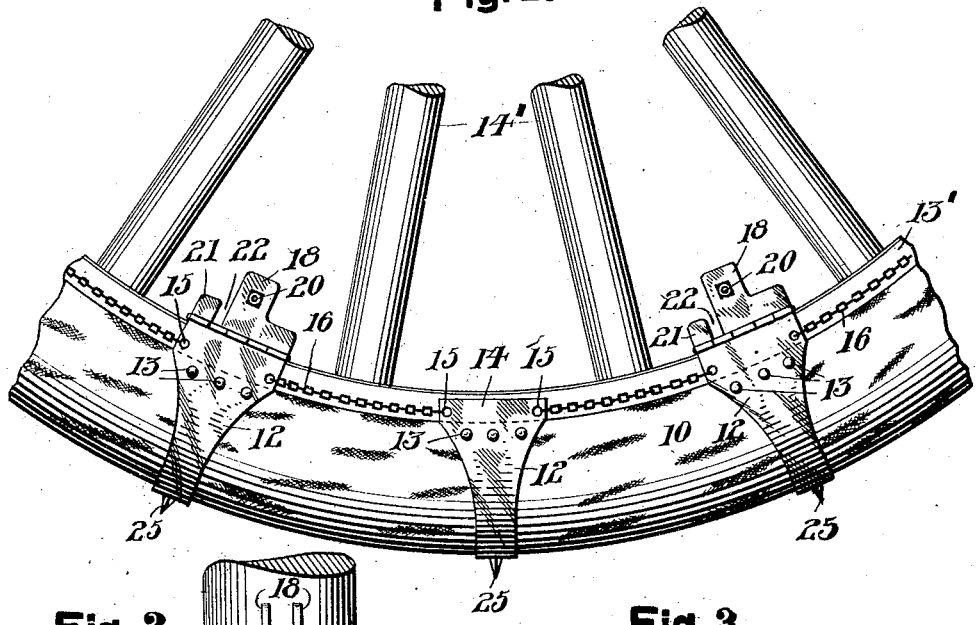
Figure 2:
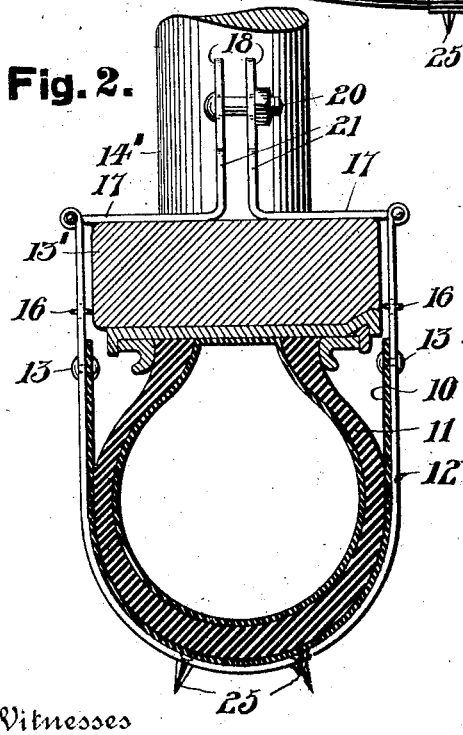
Figure 3:
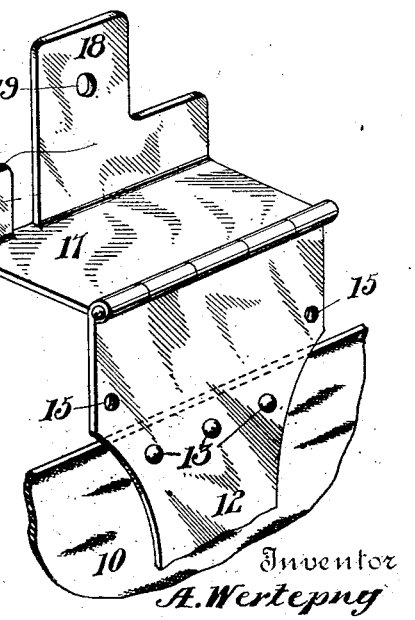

In the drawings forming a part of this application and wherein similar reference numerals designate corresponding parts throughout the several views:—Figure 1 is a side elevation of a portion of a vehicle wheel provided with the present invention. Fig. 2 is a transverse sectional view thereof, and, Fig. 3 is a perspective view of an end portion of one of the attaching means for the device, a portion of the protector being shown secured thereto.

Referring more in detail to the drawings, it is to be noted that the device includes a flexible protector or shoe 10 entirely covering the tire 11 upon which the same is adapted for use. Tread plates 12 are secured to the protector 10 by means of rivets 13 and are preferably positioned in spaced relations around the tire and exteriorly of the protector 10 and at intervals corresponding to the spaces upon the felly 13' between the spokes 14' of the wheel. Said tread plates are provided with projecting calks 25. The plates 12 are of a greater length than the width of the protector 10 to which they are secured and have oppositely-positioned enlarged ends 14 adapted to lie upon opposite sides of the felly when the device is positioned upon a wheel. The ends 14 are provided with perforations 15 in which are secured suitable connectors such as chains 16 forming flexible securing means between the adjacent tread plates. The desired ones of said tread plates 12, such as the alternating ones thereof, are utilized for securing the device to the wheel and for this purpose the ends of such plates are provided with lock plates 17 hinged thereto and adapted to fold inwardly for seating upon the inner face of the felly 13' and between the adjacent two spokes of the wheel.

The lock plates 17 are provided upon their inner adjacent edges with angularly-positioned lugs 18 having perforations 19 therethrough, the said perforations adapted to receive a locking bolt 20, thus securing the lock plate lugs together and retaining the tread plate in position upon the wheel as well as the shoe protector 10 encirclingly carried thereby. The lock plates 17 are also provided upon their inner adjacent edges of each pair of such plates with angularly-projecting ears 21 slightly separated from the adjacent lugs 18 and forming slots 22 between said ears and lugs.

The device is readily applied to the tire of a wheel by fitting the shoe protector over the tire while the required number of the chains 16 are unhooked from the end perforations 15 and when so positioned, the chains are again hooked into their connecting relations. The lock plates are then swung inwardly upon the felly 13' and by inserting a bar or other device, such as a screw driver, within the slots 22 of the opposite lock plates 17, the perforations 19 of the lock plate lugs are brought into accurate alinement with each other for the ready insertion of the locking bolt 20. The application of the device to the wheel will be thus apparent while the manner of removing the same will be clearly understood from the present description.

While the forms of the invention herein shown and described are what are believed to be preferable embodiments of the invention, it is nevertheless to be understood that various forms and modifications may be resorted to which fall within the spirit and scope of the invention as claimed.

What I claim as new is:—

In a device of the class described, a tread plate embracing the tire, locking plates hinged to the edges of the end portions thereof, angularly projecting lugs and ears spaced from said lugs mounted upon the inner adjacent edges of said locking plates and forming slots between the adjacent ears and lugs, said lugs provided with perforations therethrough to receive a locking bolt to secure them together, the perforations being in alinement when the slots are alined.

In testimony whereof I affix my signature in presence of two witnesses.

ALEXANDER WERTEPNY.

Witnesses:
H. A. MACKOFF,
P. J. PALANUK.